United States Patent
Dutta

(10) Patent No.: US 10,340,997 B2
(45) Date of Patent: Jul. 2, 2019

(54) SAME CHANNEL REPEATER FOR SATELLITE AND TERRESTRIAL LINKS

(71) Applicant: ATC Technologies, LLC, Reston, VA (US)

(72) Inventor: Santanu Dutta, Vienna, VA (US)

(73) Assignee: ATC TECHNOLOGIES, LLC, Reston, VA (US)

(*) Notice: Subject to any disclaimer, the term of this patent is extended or adjusted under 35 U.S.C. 154(b) by 75 days.

(21) Appl. No.: 15/589,512

(22) Filed: May 8, 2017

(65) Prior Publication Data

US 2017/0324460 A1 Nov. 9, 2017

Related U.S. Application Data

(60) Provisional application No. 62/332,713, filed on May 6, 2016.

(51) Int. Cl.
*H04B 7/06* (2006.01)
*H04B 17/24* (2015.01)
(Continued)

(52) U.S. Cl.
CPC .......... *H04B 7/0619* (2013.01); *H04B 7/208* (2013.01); *H04B 7/212* (2013.01); *H04B 17/24* (2015.01);
(Continued)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS

2006/0094352 A1* 5/2006 Karabinis .......... H04B 7/18543
455/13.4
2009/0034448 A1 2/2009 Miller et al.
(Continued)

OTHER PUBLICATIONS

PCT/US2017/031573 International Search Report and Written Opinion dated Jan. 4, 2018 (14 pages).

*Primary Examiner* — Brenda H Pham
(74) *Attorney, Agent, or Firm* — Michael Best & Friedrich LLP

(57) ABSTRACT

Systems and methods for same frequency/band repeaters for satellite and terrestrial links. One system includes a satellite antenna, a terrestrial antenna, a satellite transceiver coupled to the satellite antenna, a terrestrial transceiver coupled to the terrestrial antenna, and a controller communicatively coupled to transceivers. The controller is configured to receive a satellite downlink signal having a first frequency. The controller is configured to receive a plurality of terrestrial return link signals from a plurality of user terminals, the plurality of uplink signals having a second frequency. The controller is configured to generate a repeated, terrestrial downlink signal based on the satellite downlink signal. The controller is configured to generate a repeated satellite uplink signal that is a linearly amplified version of the combined terrestrial uplink signals. The controller is configured to transmit the repeated downlink signal at the first frequency. The controller is configured to transmit the combined uplink signal at the second frequency.

13 Claims, 4 Drawing Sheets

(51) Int. Cl.
*H04B 7/208* (2006.01)
*H04B 7/212* (2006.01)
*H04W 74/00* (2009.01)

(52) U.S. Cl.
CPC ....... *H04W 74/004* (2013.01); *H04W 74/006* (2013.01); *H04B 2201/698* (2013.01)

(58) Field of Classification Search
CPC .. H04W 84/18; H04W 74/08; H04B 7/18582; H04B 7/18584; H04B 7/18508; H04B 7/18515; H04B 7/18576; H04B 7/2045; H04B 7/208; H04B 7/2621
USPC ............. 370/310.2, 328, 338, 316, 319, 344
See application file for complete search history.

(56) References Cited

U.S. PATENT DOCUMENTS

| | | |
|---|---|---|
| 2010/0190507 A1 | 7/2010 | Karabinis et al. |
| 2013/0136000 A1* | 5/2013 | Torres ................... H04L 47/27 370/235 |
| 2014/0192707 A1 | 7/2014 | Dankberg et al. |
| 2015/0103723 A1* | 4/2015 | Kim ....................... H04W 4/06 370/312 |

* cited by examiner

SAME CHANNEL REPEATER FOR SATELLITE AND TERRESTRIAL LINKS

CROSS-REFERENCE TO RELATED APPLICATIONS

The present application is related to and claims benefit under 35 U.S.C. § 119(e) from U.S. Provisional Patent Application Ser. No. 62/332,713, filed May 6, 2016, titled "Terrestrial Repeater of Digital Signals Using the Same Channel for Satellite and Terrestrial Links," the entire contents of which being incorporated herein by reference.

FIELD

Embodiments described herein relate to satellite and terrestrial wireless communications systems and, more particularly, to terrestrial repeaters of satellite signals.

SUMMARY

Satellite communications systems and methods are widely used for communications with user equipment (UE). Satellite communications systems and methods generally employ at least one space-based component, such as one or more satellites, that are configured to wirelessly communicate with UEs on the Earth.

Some satellite communications systems use a single satellite antenna pattern (e.g., a beam or cell) to cover an entire service region served by the system. Alternatively or in combination with the above, in cellular satellite communications systems, multiple satellite antennae are provided, each of which can serve a substantially distinct service sub-region within an overall service region, to collectively provide service to the overall service region. Thus, a cellular architecture that is similar to that used in conventional terrestrial cellular systems can be implemented using cellular satellite-based systems. In such systems, the satellite typically communicates with UEs over a bidirectional communications pathway, with UE communications signals being communicated from the satellite to the user equipment over a downlink or forward link (also referred to as forward service link), and from the UE to the satellite over an uplink or return link (also referred to as return service link). In some cases, for example, in broadcasting, the satellite may communicate information to one or more UEs unidirectionally.

The overall design and operation of cellular satellite systems are well known to those having skill in the art, and need not be described further herein. Moreover, as used herein, the term "UE" includes cellular or satellite radiotelephones with or without a multi-line display; Personal Communications System (PCS) terminals (e.g., user terminals) that may combine a radiotelephone with data processing, data communications capabilities; smart telephones that can include a radio frequency transceiver and/or a global positioning system (GPS) receiver; and/or conventional portable computers or other electronic devices, which devices include a radio frequency transceiver. A UE also includes any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Compared to terrestrial communications, satellite communications generally have poor ability to penetrate natural and artificial blockages (e.g., trees or buildings). This is due to operating with relatively low link margins. For example, some terrestrial links may be operated with over 30 dB of link margin, whereas satellite links are rarely operated with greater than 10 dB of link margin—and are typically operated with less than 4 dB of link margin. Therefore, satellite coverage is generally poor inside buildings, in urban canyons, and under foliage. This poor signal penetration has reduced or precluded the use of satellite communications in such applications.

To address this concern, amplifying repeaters may be used. For example, an amplifying repeater with clear line of sight to the satellite and relatively high signal to noise ratio (SNR) may receive a satellite signal, boost the signal's power, and retransmit the signal terrestrially towards buildings and other cluttered areas to enable the satellite signal to be received in cluttered areas by a conventional satellite user terminal. Such repeaters now exist. For example, Satellite Digital Audio Radio Services (SDARS), such as XM-Sirius™, use such repeaters. However, in order to avoid instability due to positive feedback, or self-jamming by the repeater, a different frequency (from the received satellite signal) is used for the retransmitted terrestrial signal. The frequency used for the terrestrial retransmission is selected to be sufficiently removed from the satellite receive frequency so that the retransmitted signal creates a low response at the repeater's satellite receive antenna. As a consequence, current satellite repeater systems require more radiofrequency spectrum to operate than does an unrepeated satellite system. Furthermore, existing UEs are not able to move between the repeated and unrepeated satellite signals without modification. Thus, embodiments described herein provide, among other things, systems and methods for same-channel satellite-terrestrial repeaters.

For example, one embodiment provides a repeater system. The system includes a satellite antenna, a terrestrial antenna, a satellite transceiver coupled to the satellite antenna, a terrestrial transceiver coupled to the terrestrial antenna, and a controller communicatively coupled to the satellite transceiver and the terrestrial transceiver. The controller is configured to receive, via the satellite antenna, a downlink signal having a first frequency. The controller is configured to receive, via the terrestrial antenna, a plurality of terrestrial return link signals from a plurality of user terminals, the plurality of uplink signals having a second frequency. The controller is configured to generate a repeated downlink signal based on the downlink signal. The controller is configured to multiplex the plurality of terrestrial return link signals into a combined uplink signal. The controller is configured to transmit, via the terrestrial transceiver, the repeated downlink signal at the first frequency. The controller is configured to transmit, via the satellite transceiver, the combined uplink signal at the second frequency.

Another embodiment provides a repeater system. The system includes a satellite antenna array, a terrestrial antenna, a satellite transceiver coupled to the satellite antenna array, a terrestrial transceiver coupled to the terrestrial antenna, an adaptive null steerer, and a controller communicatively coupled to the satellite transceiver, the terrestrial transceiver, and the adaptive null steerer. The controller is configured to receive, via satellite antenna array, a first downlink signal having a first frequency and a second downlink signal having the first frequency. The controller is configured to receive, via the terrestrial antenna, a plurality of terrestrial return link signals from a plurality of user terminals, the plurality of uplink signals having a second frequency. The controller is configured to generate, with the adaptive null steerer, a substantially interference-free input signal based on the first and second downlink signals. The controller is configured to generate a repeated downlink signal based on the substantially interference-free input signal. The controller is configured to multiplex the plurality of terrestrial return link signals into a combined uplink signal. The controller is configured to transmit, via the terrestrial transceiver, the repeated downlink signal at the first frequency. The controller is configured to transmit, via the satellite transceiver, the combined uplink signal at the second frequency.

Another embodiment provides a method. The method includes receiving, via a satellite antenna, a downlink signal having a first frequency. The method includes receiving, via a terrestrial antenna, a plurality of terrestrial return link signals from a plurality of user terminals, the plurality of uplink signals having a second frequency. The method includes receiving, from a cancellation signal generator, a cancellation signal based on the downlink signal and a feedback channel response. The method includes subtracting the cancellation signal from the downlink signal to generate a substantially interference-free input signal. The method includes generating the repeated downlink signal based on the substantially interference-free input signal. The method includes generating a repeated downlink signal based on the substantially interference-free input signal. The method includes multiplexing the plurality of terrestrial return link signals into a combined uplink signal. The method includes transmitting, via a terrestrial transceiver, the repeated downlink signal at the first frequency. The method includes transmitting, via a satellite transceiver, the combined uplink signal at the second frequency.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
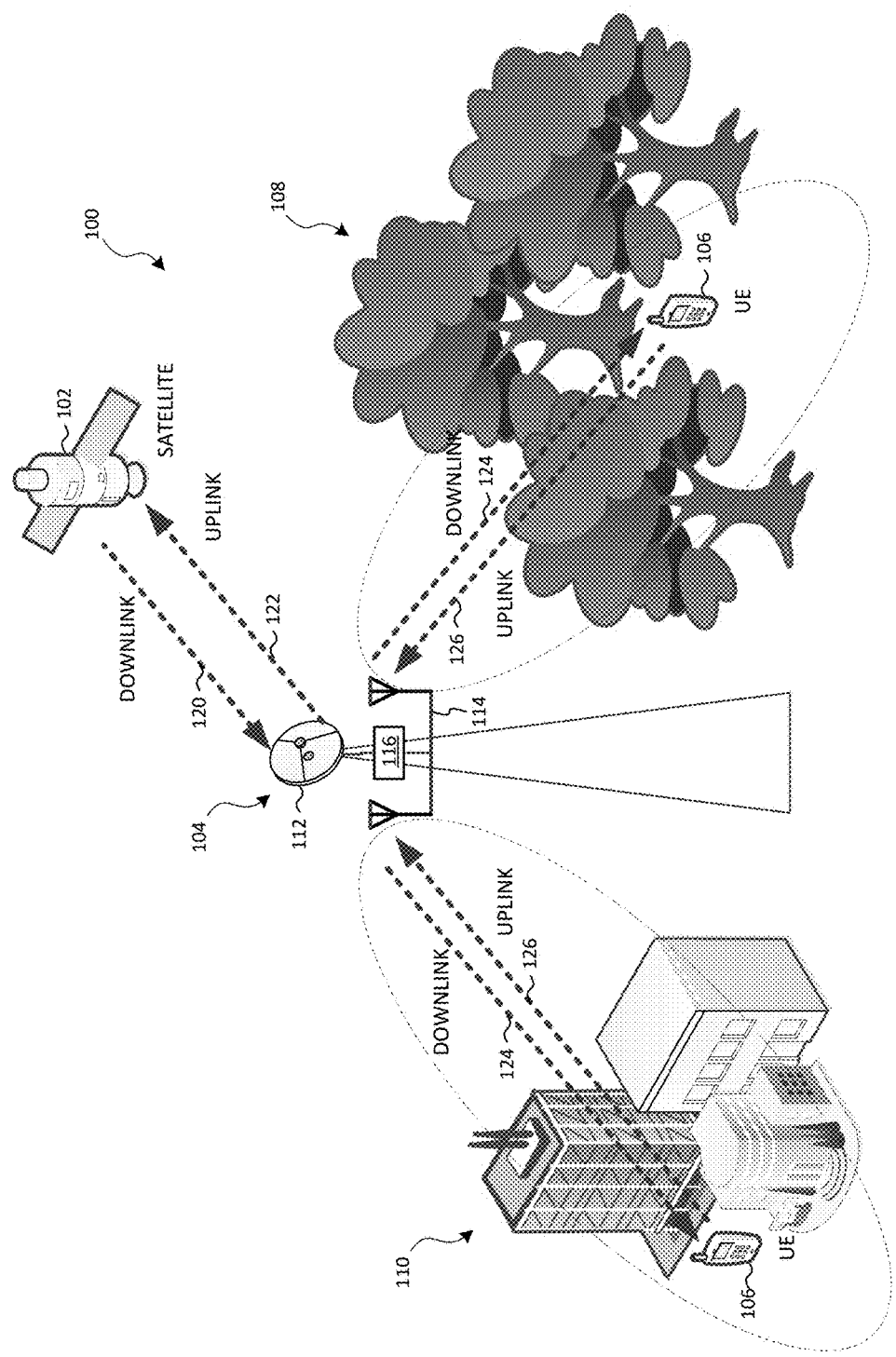
FIG. 1 is a diagram of a wireless communications system according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronics based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, each of the exemplary systems or devices presented herein is illustrated with a single exemplar of each of its component parts. Some examples may not describe or illustrate all components of the systems. Other exemplary embodiments may include more or fewer of each of the illustrated components, may combine some components, or may include additional or alternative components.

FIG. 1 is a diagram of a wireless communications system 100 according to some embodiments. The system 100 includes a satellite 102 and a bidirectional satellite-terrestrial repeater system 104. As described in more detail below, the satellite 102 and the repeater system 104 may wirelessly communicate with one or more UEs 106. When an adequate link margin is achieved (e.g., 4-10 dB), the satellite 102 communicates directly with the one or more UEs 106. However, this relatively low (compared to terrestrial links) link margin results in poor signal penetration through areas cluttered with natural and artificial blockages (e.g., trees or buildings). For example, the satellite 102 may not be able to communicate directly with UEs 106 located in a foliage-covered area 108 or an urban area 110. However, the repeater system 104 is capable of operating terrestrial wireless links with over 30 dB of link margin, which can provide coverage to UEs 106 located in the areas 108, 110.

The bidirectional satellite-terrestrial repeater system 104 includes a satellite antenna 112, a terrestrial antenna 114, and a repeater 116. The satellite 102 wirelessly communicates with the repeater system 104. The satellite 102 wirelessly transmits data to the repeater system 104 via a downlink signal 120, and the wireless repeater system 104 wirelessly transmits data to the satellite 102 via an uplink signal 122. In some embodiments, the downlink signal 120 uses a frequency in the 1526-1536 MHz band and the uplink signal 122 uses a frequency in the 1627.5-1637.5 MHz band. The repeater system 104 amplifies and retransmits the downlink signal 120 terrestrially as a repeated downlink signal 124 to the UEs 106, using the same frequency as the downlink signal 120. Terrestrial return link signals 126 are received by the repeater system 104, multiplexed onto a common channel using conventional methods, which signal is amplified and retransmitted as the satellite uplink 122. In conventional systems, the satellite downlink 120 and terrestrial downlink signals 124 operate on distinct frequencies separated by a minimum frequency separation sufficient to enable practical bandpass filters to be realized that have a low response to the terrestrially retransmitted signal to reduce self-interference. The systems and methods provided herein realize the low response without using bandpass filters, allowing the satellite downlink signal 120 and terrestrial downlink signals 124 to operate on the same frequency. As used herein, the terms, "frequency" and "band" are used interchangeably, where a "band" may include frequencies that are distinct but clustered in a group, such that the frequencies cannot be separated by filtering. Therefore, embodiments provided herein may also be applied when the original and repeated frequencies are not exactly identical but are too close for the application of traditional repeater technologies described above.

The systems and methods described herein may also be used for unidirectional repeaters, which amplify and repeat only the forward or return link signals. Embodiments may also be applied to multiple satellites, for example as used in LEO and MEO systems, connected to the repeater via multiple downlink/uplink pairs.

Figure 2:
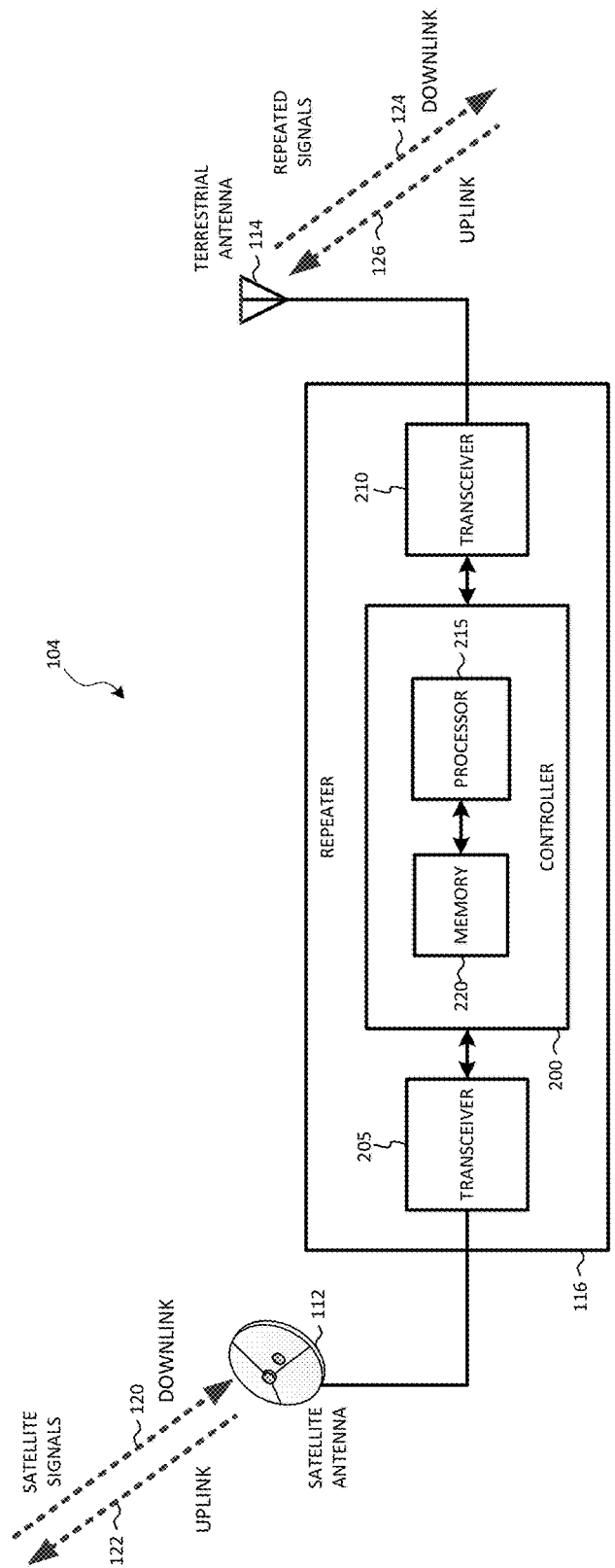
FIG. 2 is a diagram of the bidirectional repeater of the wireless communications system of FIG. 1 according to some embodiments.

FIG. 2 schematically illustrates an example embodiment of the repeater 116. The repeater 116 includes a controller 200, a satellite transceiver 205, and a terrestrial transceiver 210, which along with other various modules and components, are coupled to each other by or through one or more control or data buses that enable communication therebetween. For ease of description, the repeater 116 illustrated in FIG. 2 includes a single controller 200, satellite transceiver 205, and terrestrial transceiver 210. Alternative embodiments may include more or fewer of each of these components, may combine some components, or may include other alternative components. Some embodiments include components that perform individual functions, for example, a receiver and a transmitter, instead of combined transceiver components.

In some embodiments, the controller 200 includes a plurality of electrical and electronic components that provide power, operational control, and protection to the components and modules within the controller 200 and/or the repeater 116. For example, the controller 200 includes, among other things, an electronic processor 215 (e.g., a microprocessor, or another suitable programmable device) and a memory 220. The memory 220 includes, for example, a program storage area and a data storage area. The electronic processor 215 is coupled to the memory 220 and executes software instructions that are capable of being stored in a RAM of the memory 220 (e.g., during execution), a ROM of the memory 220 (e.g., on a generally permanent basis), or another non-transitory computer readable medium such as another memory. The electronic processor 215 is configured to retrieve from memory 220 and execute, among other things, instructions related to the control processes and methods described herein. The controller 200 also includes various digital and analog components (for example, signal amplifiers, multiplexors, digital signal processors, and the like), which for brevity are not described herein and which may be implemented in hardware, software, or a combination of both. In other constructions, the controller 200 includes additional, fewer, or different components.

The repeater 116 is configured for radiofrequency communication to and from the satellite 102 and one or more UEs 106. The repeater 116 receives the downlink signal 120 via the satellite antenna 112 and the transceiver 205, amplifies the received signal (for example, using an RF amplifier (not shown)), and transmits the amplified signal via the transceiver 210 and the terrestrial antenna 114. The repeater 116 receives the uplink signals 126 via the terrestrial antenna 114 and the transceiver 210. The multiple access feature of the chosen terrestrial uplink air interface, for example, CDMA, FDMA, or TDMA, ensures that individual uplink signals received by the repeater 116 from a plurality of UEs 106 comprise a multiplexed, or combined uplink signal. The return path of the repeater 116 transmits, linearly (thereby preserving the separation of the multiplexed UE signals) the combined uplink signal via the transceiver 205 and the satellite antenna 112. The repeater 116 is a same-frequency repeater. That is, the received signals and re-transmitted signals operate on the same frequency. An obstacle to the operation of a same-frequency repeater is self-interference, which occurs when the re-transmitted signal interferes with the reception of the original, received signal. As described more particularly below, embodiments of the repeater system 104 reduce self-interference, allowing the repeater system 104 to operate as a same-frequency repeater.

Figure 3:
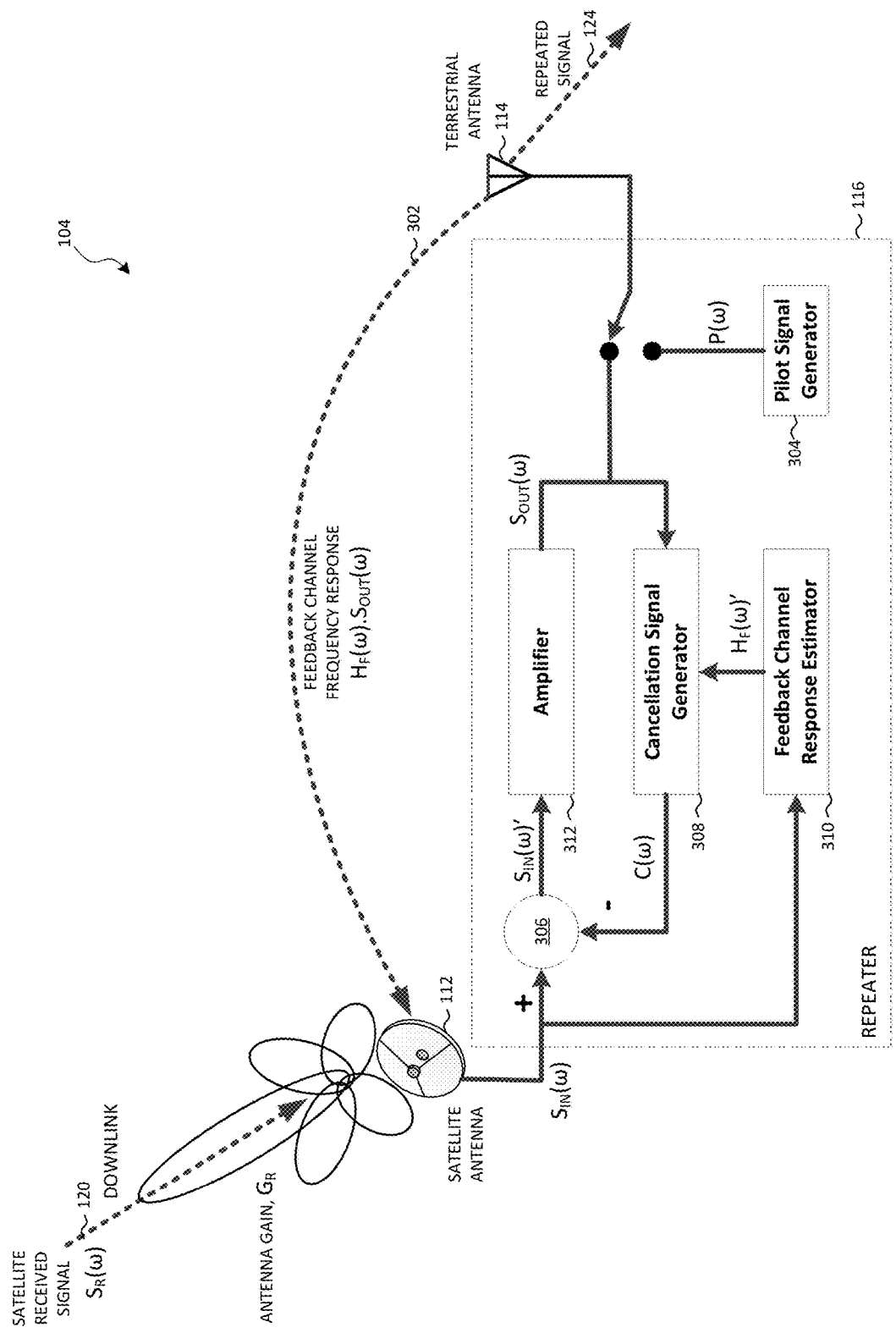
FIG. 3 is a diagram of a feedback cancellation system for a bidirectional repeater according to some embodiments.

For example, FIG. 3 schematically illustrates an embodiment of the repeater system 104 that uses a feedback cancellation system. As shown in FIG. 3, the feedback self-interference is canceled by the repeater 116 sensing the frequency response of the feedback channel 302 and canceling the self-interference adaptively by generating an appropriate cancellation signal and adding it to the input of the repeater 116 (input from the satellite antenna). In some embodiments, the frequency response of the feedback channel is sensed by injecting a pilot signal, produced by a pilot signal generator 304, at the input to the terrestrial antenna 114. In the embodiment illustrated, the pilot signal is time multiplexed with the desired signal. However, other embodiments may use other suitable techniques, for example the use of overlaid spread spectrum pilot. In such embodiments, the pilot signal reduces interference or disruption to the desired signal. In some embodiments, techniques that do not require a pilot signal also may be used.

The satellite downlink signal 120, represented in the frequency domain as $S_R(\omega)$, is received by the satellite antenna 112. In embodiments where the repeater system 104 is fixed, it may be advantageous to the repeater to have a highly directive (high gain) antenna directed at the satellite. The gain of the satellite antenna is assumed to be $G_R$. A representative pattern of a directive antenna is shown on the diagram, though other patterns are possible. The fed back self-interference signal, $H_F(\omega) \cdot S_{out}(\omega)$, enters the repeater 116 through a sidelobe of the antenna pattern. Here, $H_F(\omega)$ is the frequency response of the feedback channel 302, including the gains of the transmit and receive antennas along the feedback path(s). The composite input signal, $S_{in}(\omega)$, is given by $$S_{in}(\omega) = S_R(\omega) \cdot G_R + H_F(\omega) \cdot S_{out}(\omega) + N_0$$

Where $S_{in}(\omega)$ is the composite input signal including the received satellite signal 120, the fed back output signal 302 of the repeater 116 and additive thermal and external noise;

$S_R(\omega)$ is the received satellite signal 120 as would be received by an omnidirectional antenna;

$G_R$ is the satellite antenna 112 gain in the direction of the satellite 102;

$H_F(\omega)$ is the frequency response of feedback channel 302 from the transmit antenna connector to the receive antenna connector (i.e., it includes both antenna gains);

$S_{out}(\omega)$ is the signal at the output of the repeater 116 (i.e., at the connector of the terrestrial antenna 114); and $N_0$ is the additive noise (assumed white).

An estimated self-interference signal, or cancellation signal, $C(\omega)$, is generated by the cancellation signal generator 308 is subtracted from $S_{in}(\omega)$ (at summing node 306) to create a substantially interference-free input signal, $S_{in}(\omega)'$. $C(\omega)$ is given by $$C(\omega) = S_{out}(\omega) \cdot H_F(\omega)'$$

Where $H_F(\omega)'$ is the estimate of $H_F(\omega)$ formed by the feedback channel estimator 310, based on the input signal $S_{in}(\omega)$.

To facilitate accurate estimation of the feedback channel response, a pilot signal, $P(\omega)$ may be used, produced by a pilot signal generator 304. In one embodiment, $P(\omega)$ may be time multiplexed with the desired signal, $S_{out}(\omega)$, as shown in FIG. 3. In order to achieve time multiplexing without causing excessive harmful interference to $S_{out}(\omega)$, time and/or frequency gaps may be introduced into the satellite signal's air interface by design or the satellite air interface may already have embedded pilot signals which may be used for developing the cancellation signal without a locally generated $P(\omega)$.

Another embodiment may include addition of $P(\omega)$ to $S_{out}$ (i.e., an overlaid pilot signal), which may reduce or eliminate harmful interference to $S_{out}(\omega)$ if $P(\omega)$ is a spread spectrum signal having a low power spectral density relative to the desired signal.

Yet another embodiment may include blind estimation of the feedback channel, which may be used if the fed back signal, $H_F(\omega) \cdot S_{out}(\omega)$, is much larger than the desired signal, $S_R(\omega) \cdot G_R$. This may be the case in practice because the received satellite signal, $S_R(\omega) \cdot G_R$, is likely to be weak compared to the terrestrially rebroadcast repeated downlink signal 124. One example blind estimation approach is to minimize the power of $S_{in}(\omega)$ while adjusting the $H(\omega)'$, subject to a constraint that prevents reducing $S_{in}(\omega)$ to zero, which would lead to repeater shutdown and comprise a trivial solution. Power minimization occurs when $H_F(\omega)'$ is well matched with $H_F(\omega)$.

The adjustment of $C(\omega)$ to match $H_F(\omega)$ may be performed by adaptively adjusting the complex weights of a transversal filter based on Least Mean Squared Error optimization, Constrained Minimum Power optimization, Decision Feedback based optimization, or combinations of the foregoing.

In some embodiments, the output signal, $S_{out}(\omega)$, is developed by linearly amplifying $S_{in}(\omega)'$ with an amplifier 312. However, this may also amplify and rebroadcast the input noise term, $N_0$. In some applications, this may acceptable, for example if the aim is to provide a modest amount of increased coverage for the satellite signal without greatly enhancing its received $C/N_0$ relative to clear line-of-sight reception. However, in other embodiments, coverage may be increased substantially by regenerating the received satellite signal. This may be accomplished by demodulating and re-modulating the physical layer data of the satellite air interface.

Figure 4:
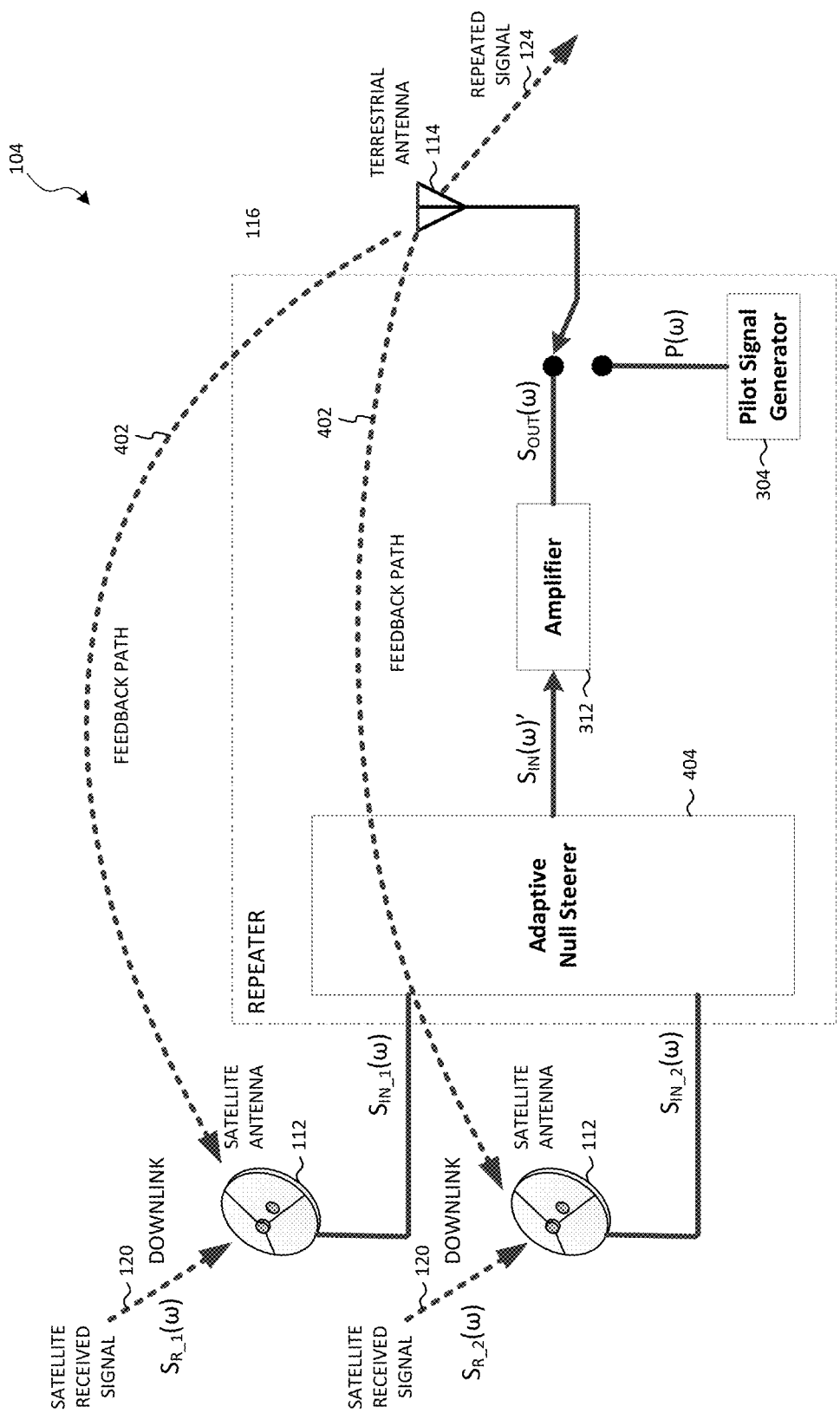
FIG. 4 is a diagram of an adaptive nulling system for a bidirectional repeater according to some embodiments.

In another example, FIG. 4 schematically illustrates an adaptive nulling system for a repeater system 104. If the feedback channel response at the satellite input to the repeater could be sufficiently reduced, the need for cancellation of the feedback (for example, using the system and method of FIG. 3) may be reduced or avoided. In some embodiments of the repeater system 104, this principle is exploited using an adaptive antenna array for the satellite receives, with a null of the array pattern adaptively pointed at the terrestrial antenna.

In one example embodiment, a two element array (that is, two satellite antennas 112) is sufficient to steer a single null. In some embodiments, additional antenna elements may improve performance in multipath situations. FIG. 4 illustrates a repeater system 104 with a 2-element receive array for the satellite signals, which are received as $S_{in\_1}(\omega)$ and $S_{in\_2}(\omega)$. Both of these signals have self-interference signal components, received via the feedback paths 402. The signals $S_{in\_1}(\omega)$ and $S_{in\_2}(\omega)$ are input to an adaptive null steerer 404. Adaptive null steerers use an adjustable set of weights (for example, filter coefficients) to combine multiple receive antenna sources into a single signal with improved spatial directivity. Adaptive null steering algorithms use numerical optimization to modify or update these weights as the environment varies. Such algorithms use many possible optimization schemes (for example, least mean squares, sample matrix inversion, and recursive least squares). In some embodiments, a pilot signal (for example, as describe above with respect to FIG. 3) may be used by the adaptive null steerer 404 to facilitate the adaptive array processing. Accordingly, using conventional techniques of adaptive antenna processing, the adaptive null steerer 404 creates a synthetic antenna array pattern that has a substantially reduced response (e.g., a null) towards the transmitter (e.g., the terrestrial antenna 114). By reducing the response, the self-interference feedback may be reduced or effectively eliminated.

The forgoing specification mostly used the Forward path of the repeater (i.e., satellite to terrestrial) for the narrative. The same methods would be applied in the Return path (i.e., terrestrial to satellite). The Return feedback path will be different from the Forward path but repeater will automatically sense the frequency response of the Return path and cancel it in the same way as for the Forward path. The only special requirement in the Return path is greater linearity, as mentioned above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A repeater system comprising:
    a satellite antenna;
    a terrestrial antenna;
    a satellite transceiver coupled to the satellite antenna;
    a terrestrial transceiver coupled to the terrestrial antenna;
    a pilot signal generator; and a controller communicatively coupled to the pilot signal generator, the satellite transceiver, and the terrestrial transceiver, and configured to
receive a pilot signal from the pilot signal generator;
inject the pilot signal to an input of the terrestrial antenna;
receive, via the satellite antenna, a downlink signal having a first frequency;
receive, via the terrestrial antenna, a plurality of terrestrial return link signals from a plurality of user terminals, the plurality of terrestrial return link signals having a second frequency;
generate a repeated downlink signal based on the downlink signal;
multiplex the plurality of terrestrial return link signals into a combined uplink signal;
transmit, via the terrestrial transceiver, the repeated downlink signal at the first frequency; and
transmit, via the satellite transceiver, the combined uplink signal at the second frequency.

2. The system of claim 1, further comprising:
a cancellation signal generator communicatively coupled to the controller, wherein the controller is further configured to
receive, from the cancellation signal generator, a cancellation signal based on the downlink signal and a feedback channel response;
subtract the cancellation signal from the downlink signal to generate a substantially interference-free input signal; and
generate the repeated downlink signal based on the substantially interference-free input signal.

3. The system of claim 2, further comprising:
an amplifier communicatively coupled to the controller, wherein the controller is further configured to
amplify the substantially interference-free input signal to generate the repeated downlink signal.

4. The system of claim 2, further comprising:
a feedback channel response estimator communicatively coupled to the controller, wherein the controller is further configured to
receive, from the feedback channel response estimator, a feedback channel response based on the downlink signal.

5. The system of claim 2, wherein the controller is further configured to
demodulate the substantially interference-free input signal to generate a demodulated substantially interference-free input signal; and
modulate the demodulated substantially interference-free input signal to generate the repeated downlink signal.

6. A repeater system comprising:
a satellite antenna array;
a terrestrial antenna;
a satellite transceiver coupled to the satellite antenna array;
a terrestrial transceiver coupled to the terrestrial antenna;
an adaptive null steerer; and
a controller communicatively coupled to the satellite transceiver, the terrestrial transceiver, and the adaptive null steerer, and configured to
receive, via satellite antenna array, a first downlink signal having a first frequency and a second downlink signal having the first frequency;
receive, via the terrestrial antenna, a plurality of terrestrial return link signals from a plurality of user terminals, the plurality of terrestrial return link signals having a second frequency;
adaptively steer pattern nulls for the satellite antenna array with the adaptive null steerer to generate a substantially interference-free input signal based on the first and second downlink signals;
generate a repeated downlink signal based on the substantially interference-free input signal;
multiplex the plurality of terrestrial return link signals into a combined uplink signal;
transmit, via the terrestrial transceiver, the repeated downlink signal at the first frequency; and
transmit, via the satellite transceiver, the combined uplink signal at the second frequency.

7. The system of claim 6, wherein the controller is further configured to
demodulate the substantially interference-free input signal to generate a demodulated substantially interference-free input signal; and
modulate the demodulated substantially interference-free input signal to generate the repeated downlink signal.

8. The system of claim 6, further comprising:
an amplifier communicatively coupled to the controller, wherein the controller is further configured to
amplify the substantially interference-free input signal to generate the repeated downlink signal.

9. The system of claim 6, further comprising:
a pilot signal generator communicatively coupled to the controller, wherein the controller is further configured to
receive a pilot signal from the pilot signal generator; and
inject the pilot signal to an input of the terrestrial antenna.

10. A method comprising:
receiving, via a satellite antenna, a downlink signal having a first frequency;
receiving, via a terrestrial antenna, a plurality of terrestrial return link signals from a plurality of user terminals, the plurality of terrestrial return link signals having a second frequency;
receiving, from a cancellation signal generator, a cancellation signal based on the downlink signal and a feedback channel response;
subtracting the cancellation signal from the downlink signal to generate a substantially interference-free input signal;
generating the repeated downlink signal based on the substantially interference-free input signal;
amplifying the substantially interference-free input signal to generate a repeated downlink signal based on the substantially interference-free input signal;
multiplexing the plurality of terrestrial return link signals into a combined uplink signal;
transmitting, via a terrestrial transceiver, the repeated downlink signal at the first frequency; and
transmitting, via a satellite transceiver, the combined uplink signal at the second frequency.

11. The method of claim 10, further comprising:
receiving, from a feedback channel response estimator, the feedback channel response based on the downlink signal.

12. The method of claim 10, further comprising:
demodulating the substantially interference-free input signal to generate a demodulated substantially interference-free input signal; and
modulating the demodulated substantially interference-free input signal to generate the repeated downlink signal.

13. The system of claim 10, further comprising:
  receiving a pilot signal from a pilot signal generator; and
  injecting the pilot signal to an input of the terrestrial antenna.

\* \* \* \* \*